June 26, 1923.

G. H. IRWIN 1,459,894

REVERSIBLE DIFFERENTIAL GEARING FOR VEHICLES

Filed Feb. 10, 1919        3 Sheets-Sheet 1

INVENTOR
George H. Irwin
By
Schmidt & Hauser
ATTORNEYS

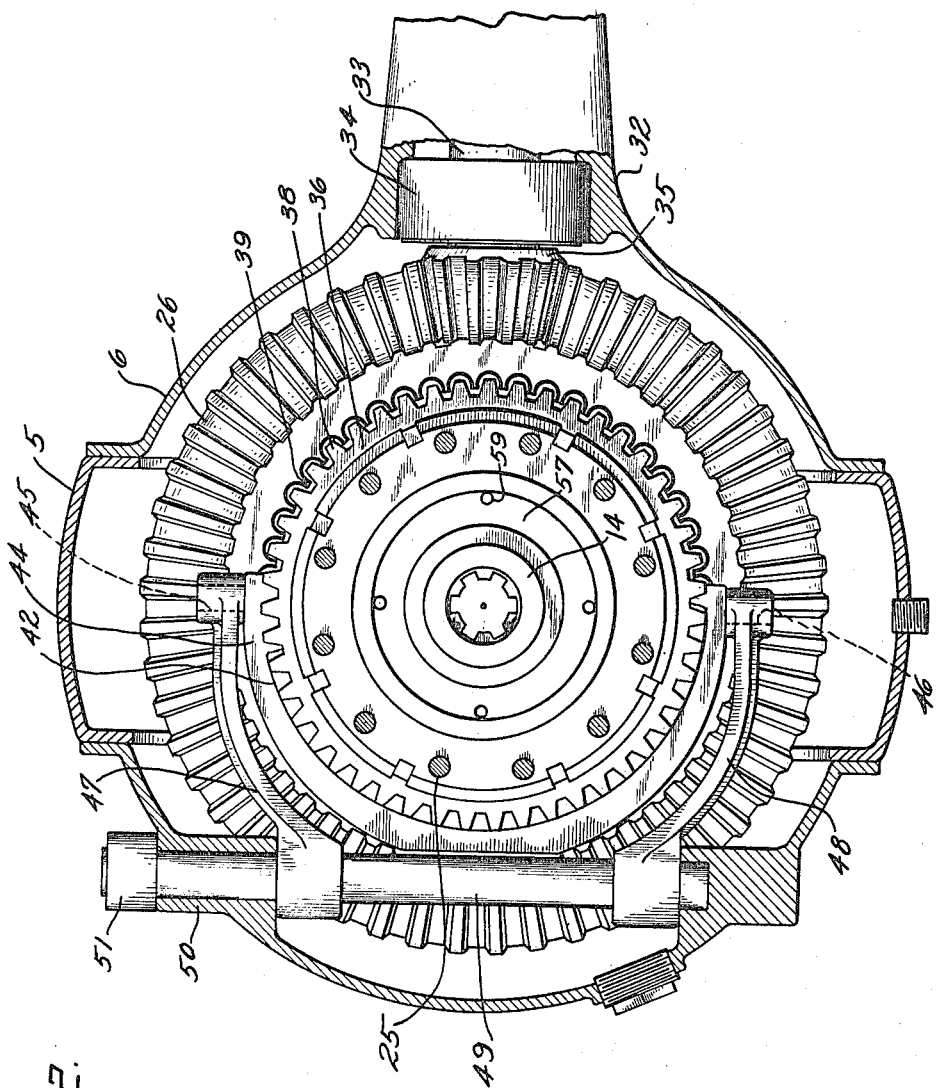

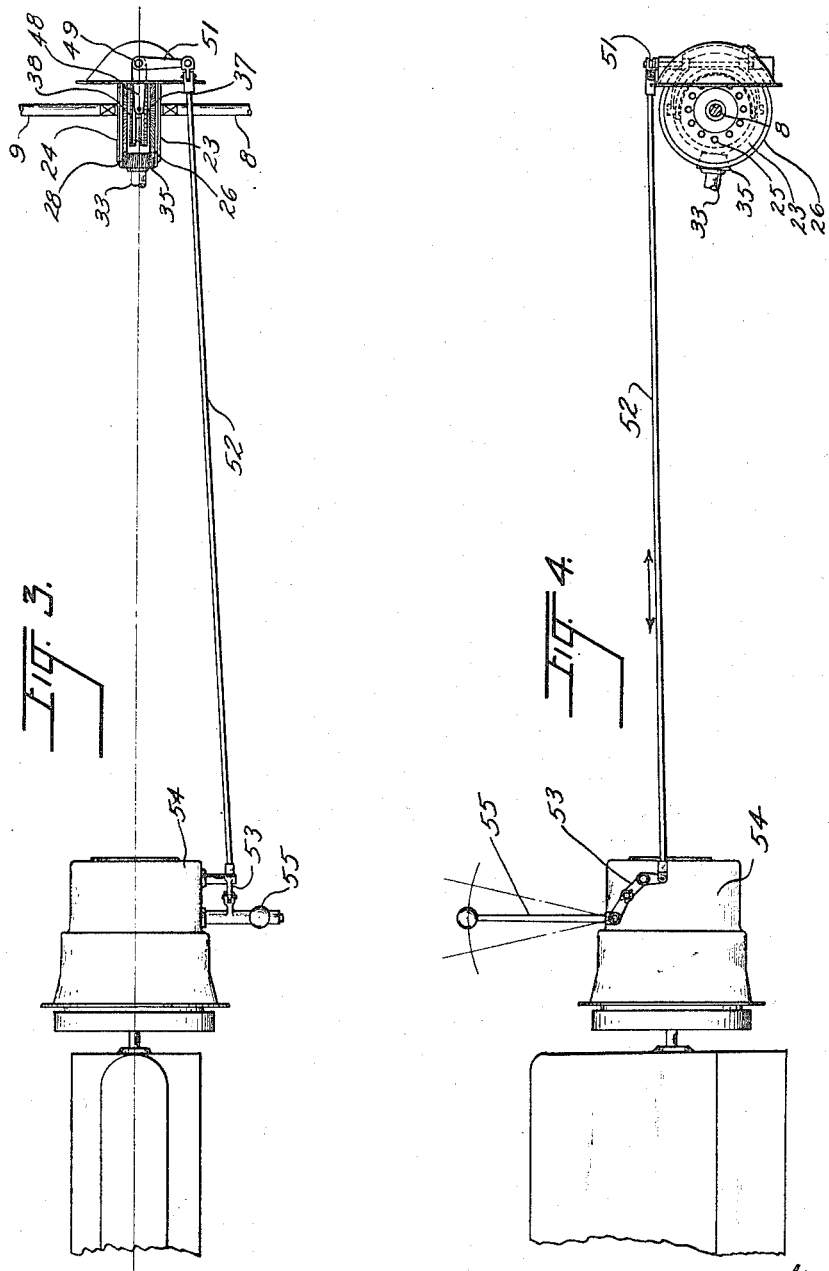

Patented June 26, 1923.

1,459,894

UNITED STATES PATENT OFFICE.

GEORGE H. IRWIN, OF CHICAGO, ILLINOIS, ASSIGNOR TO UTILITIES DEVELOPMENT CORPORATION, OF CHICAGO, ILLINOIS, A CORPORATION OF ILLINOIS.

REVERSIBLE DIFFERENTIAL GEARING FOR VEHICLES.

Application filed February 10, 1919. Serial No. 276,034.

*To all whom it may concern:*

Be it known that I, GEORGE H. IRWIN, a citizen of the United States, and a resident of Chicago, in the county of Cook and State of Illinois, have invented certain new and useful Improvements in Reversible Differential Gearing for Vehicles, of which the following is a specification.

My invention relates to reversible differential gearing for vehicles, particularly automobiles, and its object is to provide improved simple, durable and practical construction and arrangement whose operation is well balanced and efficient.

On the accompanying drawings my improved construction and arrangement is clearly shown. On the drawings—

Fig. 2 is a sectional view through the housing on plane 2—2, Fig. 1, with one transmission gear and end plate removed, Fig. 3 is a plan view diagrammatically illustrating the location and control of the gearing in a vehicle, and Fig. 4 is a side elevational view of this arrangement in the vehicle.

Figure 1:
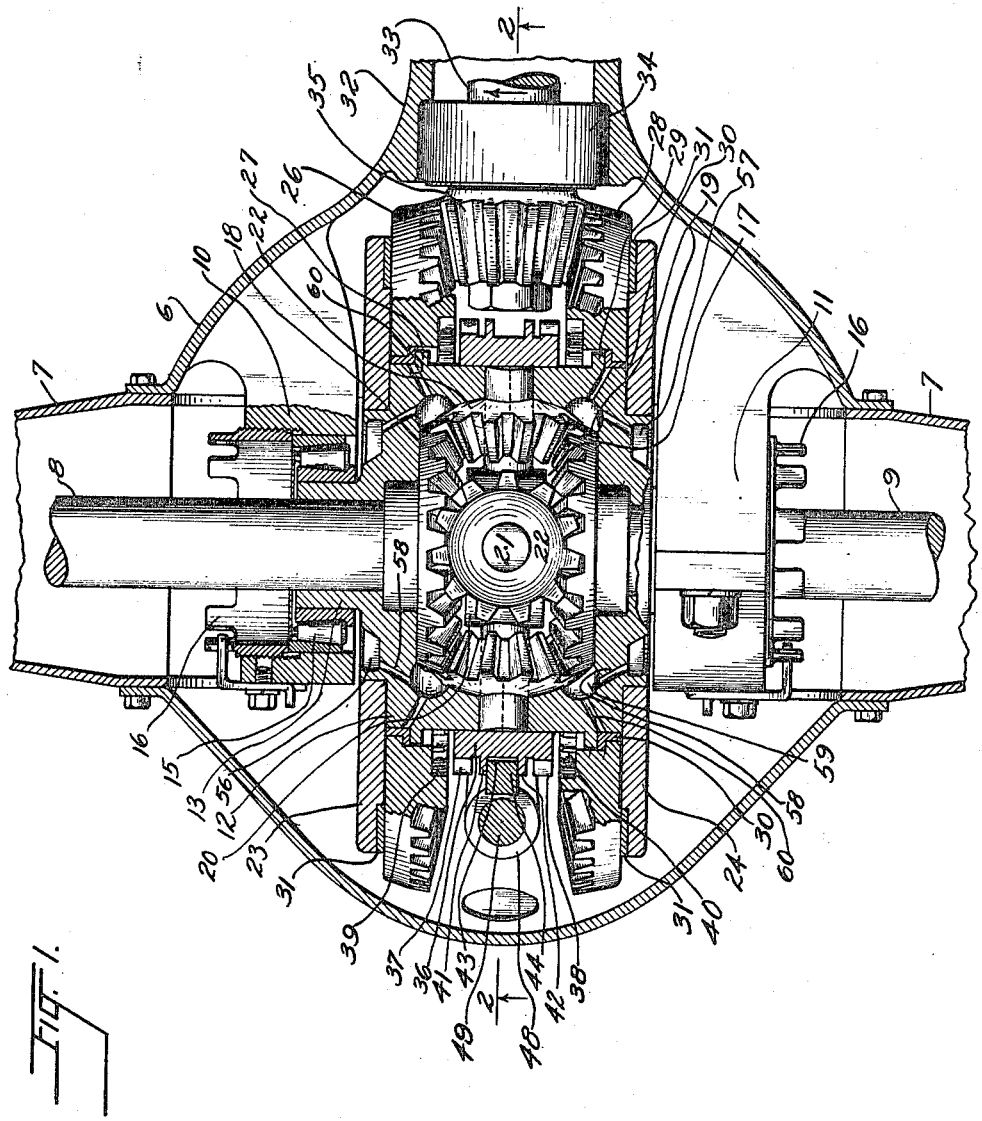
Fig. 1 is a horizontal diametral sectional view.

Referring to Figs. 1 and 2, 5 and 6 represent the housing frame and 7 the tubular extensions for enclosing the vehicle driving shaft sections 8 and 9. The housing 6 supports two bearing or journal box structures 10 and 11. A cylindrical hub frame 12, which may be composed of similar halves, has its ends 13 and 14 extending into the bearing brackets, roller bearings 15 being interposed, and adjusting rings 16 provided therefor, these rings being shown as threading into the ends of the bearing structures to adjust the outer member of the roller bearings so that the bearings can be adjusted and the wear thereon taken up from time to time. The hub structure is hollow to form the compartment 17. The drive shaft sections 8 and 9 extend through the ends of the hub and have bearing therein and the differential bevel gears 18 and 19 are splined or otherwise secured to the inner ends of the shaft sections and are located against the opposite walls of the hub within the compartment 17. The frame 20 within the chamber 17 has radial arms 21 on which the differential pinions 22 are mounted to mesh with the differential gears 18 and 19, the ends of the arms 21 extending into the hub 12.

The end plates 23 and 24 on the hub 12 are concentric therewith and are secured thereto by the pins 25. The transmission gear 26 is journalled on the hub and is confined between the plate 23 and the annular flange 27 on the hub, a similar gear 28 being journalled on the hub and confined between the end plate 24 and the annular flange 29 on the hub. Between the hub and the gears anti-friction bushings 30 are inserted and between the gears and the outer ends of the plates anti-friction material 31 is inserted.

Extending forwardly from the housing 6 is the tubular extension 32 through which extends the propulsion shaft 33 driven by the vehicle engine. The rear end of this shaft journals in the bearing 34 and has secured thereto the drive pinion 35 which is at all times in mesh with the bevel teeth of the gears 26 and 28, the direction of propulsion of the vehicle depending upon which of the gears is clutched to the hub 12. To clutch either gear to the hub the clutch collar 36 is provided which is splined to the hub to rotate therewith but to be shifted thereon in axial direction. At its sides the collar has the clutch teeth 37 and 38 respectively which are adapted to intermesh respectively with the internal clutch teeth 39 and 40 on the transmission gears 26 and 28. The collar has the parallel spaced apart flanges 41 and 42 forming the annular groove 43 which receives the semi-circular yoke 44. This yoke at its ends has pins 45 and 46 extending radially outwardly therefrom and received by the inner ends of the arms 47 and 48 extending from and secured to the vertical post 49 which is rotationally supported by the housing 6 and which extends to the exterior thereof through the lug 50. At its outer end the post has the lever arm 51 which is connected by a rod 52 controllable from the front of the vehicle. As shown in Figs. 3 and 4, the rod connects at its front end with one end of the bell crank lever 53 pivoted on the transmission housing 54, the other end of the lever being pivoted to the lower end of the hand lever 55.

Describing the operation, assume that the propulsion shaft 33 is rotating in the direction indicated by the arrow, Fig. 1, and the reverse lever 55 manipulated to cause the clutch collar 36 to be shifted into position with its clutch teeth in engagement with the clutch teeth of the gear 26. The drive pinion 35 will rotate the gear 26 in forward direction and the gear 28 in reverse direction. The gear 28 travels idly on the hub but the rotation of the gear 26 is transmitted by the clutch collar to the hub 12 and the pinions 22 transmit the rotation of the hub to the differential gears 18 and 19 and the shaft sections 8 and 9 are rotated to cause forward propulsion of the vehicle. By virtue of the differential gears and pinions the shaft sections 8 and 9 can of course rotate differentially in the well known manner. If the clutch collar is shifted into clutching engagement with the gear 28 the gear 26 will rotate idly on the hub and the rotation of the gear 28 will be transmitted to the hub and through the differential pinions and gears to the shaft sections to cause reverse direction of travel of the vehicle. Thus by the simple shifting of the clutch collar in one direction or the other the vehicle drive wheels are connected with the vehicle propeller shaft to propel the vehicle either in forward or rearward direction and the vehicle drive wheels are free at all times to rotate differentially. The construction and arrangement is very simple, compact, and of great strength, and is perfectly balanced, and its operation is therefore noiseless and efficient.

The housing 6 contains a lubricant, such as oil, into which the gears 26 and 28 and end plates 23 and 24 dip. The engaging surfaces between the end plates and the gears are thus well lubricated. At the ends of the hub I provide the annular pockets 56 and 57 which receive the lubricant which flows therefrom through the ducts 58 to the pockets or sumps 59 formed within the hub and from these sumps the lubricant travels through the ducts 60 to the bearing surfaces between the gears 26 and 28 and the hub and the surface between the pinions 22 and the hub. As the hub rotates rapidly the oil in the pockets 56 is subjected to centrifugal force and flows with considerable pressure through the ducts 58 which are outwardly inclined so that the sumps 59 and the compartment 17 have at all times adequate supply of lubricant for the intermeshing teeth of the differential pinions and gears. The centrifugal effect also forces the oil through the ducts 60. There is practically a continuous circulation of lubricant from the housing and along the various bearing surfaces and there is no chance for stagnation of oil and all the surfaces are continuously supplied with fresh lubricant.

I do not, of course, desire to be limited to the exact construction and arrangement shown and described as changes and modifications are no doubt possible which would still come within the scope of the invention.

I claim as follows:

1. In differential driving mechanism, the combination with differential gearing, of a rotatable hub, a shaft structure connected to rotate with said hub, end plates secured to said hub, peripheral flanges on said hub adjacent said end plates, transmission gears confined on said hub between said end plates and flanges and rotatable on said hub, means for rotating said gears, and clutch mechanism located between said end plates for clutching either of said gears in driving connection with said hub.

2. In differential drive mechanism, the combination of a hub having a chamber therein, axle sections extending outwardly from said hub, differential gear mechanism within said hub chamber for connecting said hub to said axle sections, transmission gears journalled on said hub to rotate thereon, means for rotating said gears, clutch mechanism for connecting either gear in driving relation with said hub, a housing surrounding said hub for containing lubricant, said gears dipping into said lubricant to splash it when they rotate, an annular pocket on the outside of said hub for receiving lubricant and subjecting it to centrifugal force during rotation of the structure, ducts leading from said pocket into said hub chamber through which lubricant is forced from said pocket by the centrifugal force, and ducts leading outwardly from said chamber to the bearing surfaces between said gears and hub.

3. In differential drive mechanism, the combination of a hub having a chamber therein, axle sections extending outwardly from said hub, differential gear mechanism within said hub chamber for connecting said hub to said axle sections, means for rotating the hub, a housing surrounding said hub for containing lubricant, an annular pocket on the outside of said hub for receiving lubricant and subjecting it to centrifugal force during rotation of the structure, ducts leading from said pocket into said hub chamber through which lubricant is forced from said pocket by the centrifugal force, and ducts leading outwardly from said chamber to the bearing surfaces of the hub.

4. In differential drive mechanism, the combination of a hub having a chamber therein, axle sections extending outwardly from said hub, differential gear mechanism within said hub chamber for connecting said hub to said axle sections, means for rotating said hub comprising gears, a housing surrounding said hub for containing lubricant, said gears dipping into said lubricant to splash it when they rotate, an annular pocket on the outside of said hub for receiving lubricant and subjecting it to centrifugal force during rotation of the structure, ducts leading from said pocket into said hub chamber through which lubricant is forced from said pocket by the centrifugal force, and ducts leading outwardly from said chamber to the bearing surfaces between said gear and hub.

5. In a differential drive mechanism, the combination of a hub having a chamber therein, axle sections extending outwardly from said hub, differential gear mechanism within said hub chamber for connecting said hub to said axle sections, means for rotating the hub, a housing surrounding said hub for containing lubricant, means on the outside of said hub for receiving lubricant and subjecting it to centrifugal force during rotation of the structure, ducts leading from said means into said hub chamber through which lubricant is forced from said means by the centrifugal force, and ducts leading outwardly from said chamber to the bearing surfaces of the hub.

6. In differential driving mechanism, the combination with differential gearing, of a rotatable hub, a shaft structure connected to rotate with said hub, end plates secured to said hub, peripheral flanges on said hub adjacent said end plates, transmission gears confined on said hub between said end plates and flanges and rotatable on said hub, said transmission gears being provided with stepped openings, the peripheral flanges being received in intermediately dimensioned portions of said openings, and means for rotating said gears, and clutch mechanism located between said end plates for clutching either of said gears in driving connection with said hub, comprising radially-arranged teeth positioned in a larger dimensioned portion of said stepped opening.

7. In differential driving mechanism, the combination with differential gearing, of a rotatable hollow hub comprising two half sections provided with integral side and peripheral walls, a shaft structure connected to rotate with said hub, end plates secured to the side walls of the hub and projecting peripherally of the hub, peripheral flanges on the peripheral wall of said hub, transmission gears freely and relatively rotatable upon said peripheral wall, and annularly confined between said flanges and plates, and means for connecting one of said gears to said hub for rotation therewith.

8. In differential driving mechanism, the combination with differential gearing, of a rotatable hollow hub comprising two half sections provided with integral side and peripheral walls, a shaft structure connected to rotate with said hub, end plates secured to the side walls of the hub and projecting peripherally of the hub, peripheral flanges on the peripheral wall of said hub, transmission gears freely and relatively rotatable upon said peripheral wall, and annularly confined between said flanges and plates, means for connecting one of said gears to said hub for rotation therewith, driving shaft having a pinion fixedly and directly secured to one end thereof between said transmission gears and in permanent driving engagement therewith.

9. The combination of a rotatable hollow hub having integral side and peripheral walls, a differential gearing completely contained within said hub, shaft ends axially entering said hub and operatively connected to said differential gearing, a pair of freely and independently rotatable driving elements externally and axially mounted on said hub, retaining and guiding means on the hub for said driving elements, driving means connected directly to both of said driving elements, said hub being fluid tight and adapted to contain lubricant, means for conducting the lubricant centrifugally from the interior of the hub to the external bearing surfaces thereof when the hub is rotated, and means for connecting one of said driving elements to the hub for rotation thereof.

10. The combination with a rotatable closed housing adapted to contain a liquid lubricant and having gearing therein, and external driving elements freely rotatable externally of and upon said housing and adapted to be connected thereto for rotating the housing, of means for conducting the liquid lubricant contents of said housing by centrifugal force from the interior of said housing to the external bearing surfaces of the housing and driving elements.

In witness whereof, I hereunto subscribe my name this 8th day of February, A. D. 1919.

GEORGE H. IRWIN.